United States Patent Office 3,340,209
Patented Sept. 5, 1967

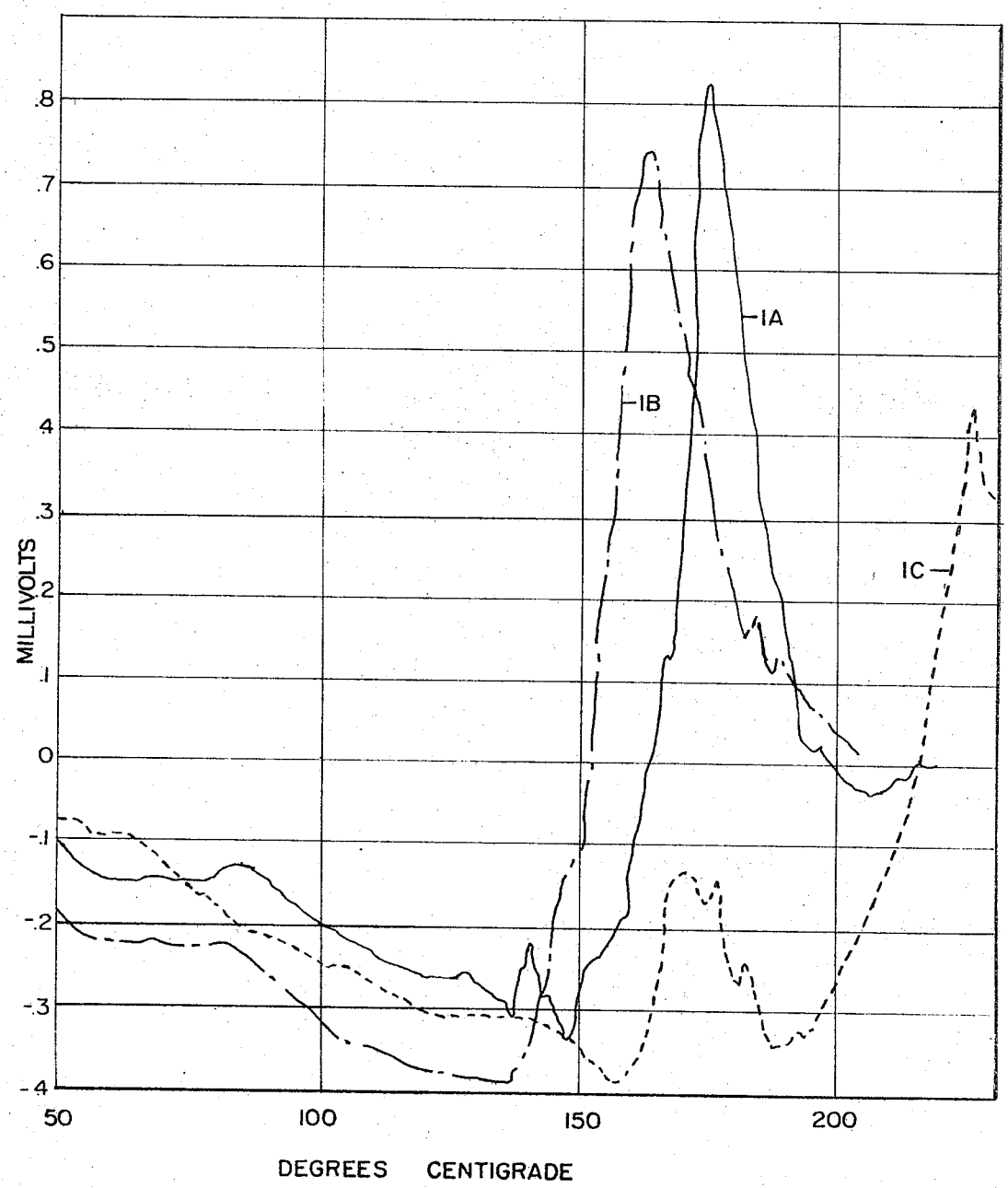

3,340,209
ACTIVATED AZODICARBONAMIDE
Charles P. Riley, Jr., Lowell, Richard Strauss, Lexington, and Henry R. Lasman, Wilmington, Mass., assignors to National Polychemicals, Inc., Wilmington, Mass., a corporation of Massachusetts
Filed Dec. 31, 1964, Ser. No. 422,605
11 Claims. (Cl. 260—2.5)

ABSTRACT OF THE DISCLOSURE

An activated azodicarbonamide composition having a primary decomposition range between about 150–170° C. is provided by a combination of sodium or potassium bicarbonate with finely divided azodicarbonamide in the presence of a mixture of alkali metal salts such as potassium, and a heavy metal salt such as zinc. The inexpensive activated azodicarbonamide composition may be prepared in dry form or dispersed in a plasticizer with from about 1 to 40% of the bicarbonate present in the mixture.

Our invention relates to novel chemical blowing compositions and to plastic compositions containing these blowing agent compositions. In particular, our invention concerns both liquid and dry mixture blowing agent compositions containing a bicarbonate and azodicarbonamide. This application is a continuation-in-part of our patent application Ser. No. 257,567, filed Feb. 11, 1963, now U.S. Patent No. 3,305,396 issued Feb. 21, 1967.

The selection of a suitable chemical blowing agent compound for forming cellular or foamed plastic products is commonly made with reference to the temperature at which the blowing agent decomposes to evolve gas, to the fluidity temperature range of the material to be blown, and to the nature of the cellular product produced thereby. Azodicarbonamide is a well-known, efficient nitrogen-releasing agent for the preparation of foamed polyvinyl chloride resin with a fine uniform cellular structure. Azodicarbonamide has a decomposition temperature in air of about 195° to 200° C. and of about 190° C. in dioctylphthalate. Sodium bicarbonate alone releases carbon dioxide gas slowly upon being heated and has a fairly wide decomposition temperature range initially starting at about 80° C. to rapid release of carbon dioxide at a range of about 150–170° C. Although inexpensive, it has not been commercially adopted as a blowing agent for many products including vinyl resin foams or elastomers, because a relatively short decomposition temperature is required to coincide with the curing or gel rate of the polymer system being blown. Additionally, sodium bicarbonate alone produces a relatively large cell structure in the foam system which is often very undesirable.

Azodicarbonamide is made from hydrazine and is therefore a relatively expensive fine organic chemical, whereas sodium bicarbonate is relatively inexpensive and readily available in commercial supply. A substitution of a portion of the inexpensive sodium bicarbonate for the more expensive azodicarbonamide has heretofore proven wholly unsatisfactory since each blowing agent retains its distinctive initial decomposition temperature and decomposition temperature range.

For many applications, it is quite desirable to have azodicarbonamide decomposed at a lower temperature range. Decomposition at a lower temperature would permit a reduction in the heat degradation of the plastic composition in which the blowing agent is incorporated. Further, lower decomposition temperatures permit shorter processing cycles and allow enhanced decomposition rates permitting lower processing temperature or shorter residence times in the oven or a combination thereof. In our parent patent application, we have disclosed the use of zinc salts like zinc oxide and potassium salts like potassium oleate for initiating azodicarbonamide decomposition in the 150–170° C. decomposition range, or even lower. It is therefore readily apparent that a successful substitution of a portion of the azodicarbonamide commonly employed as a blowing agent with sodium bicarbonate, would result in a significant reduction in the economics and cost of the blowing agent system. This substitution, of course, must produce a product of substantially the same, or better quality, than the cellular product produced by the use of azodicarbonamide alone. Additionally, such substitution would be of enhanced effectiveness if the temperature decomposition range of such mixture could be lower than the usual decomposition range of the azodicarbonamide. In this manner, the economic advantages of the bicarbonate and the processing advantages of the lower decomposition range would be significant.

It is therefore an object of our invention to provide both liquid and dry blowing agent compositions containing azodicarbonamide and a bicarbonate, which provides an inexpensive means of producing cellular products of good quality.

It is also an object of our invention to provide a blowing agent composition comprising azodicarbonamide and a bicarbonate, which mixture has an initial decomposition temperature of below 170° C.

It is a further object of our invention to provide an organic or resinous plastic composition containing our blowing agent composition which plastic composition is capable of being activated on heating into a chemically-blown cellular structure of good quality.

Further objects and advantages of our invention will be apparent to those persons skilled in the art from the following description of our invention when taken in conjunction with the accompanying drawing, wherein there is shown a graphical illustration comparing the decomposition characteristics of azodicarbonamide alone, a mixture of azodicarbonamide and sodium bicarbonate, and a mixture of azodicarbonamide, sodium bicarbonate in the chemical blowing agent composition of our invention.

We have discovered that a portion of the azodicarbonamide in our azodicarbonamide decomposition activator composition may be substituted by an inexpensive bicarbonate such as sodium bicarbonate. Further, we have found that vinyl chloride and other polymeric foams may be prepared with this system which are equal or better in quality and densities to those prepared with the use of azodicarbonamide alone or with the use of azodicarbonamide and the decomposition activator of our parent application. We have found that in the presence of our activator composition the separate and distinct decomposition ranges of azodicarbonamide and sodium bicarbonate may be united into a single primary decomposition range between about 150–170° C. Further, we have found that finely divided dry mixtures of azodicarbonamide, sodium bicarbonate and our activator compositions may be prepared, which mixtures eliminate certain difficulties occasioned with the use of liquid compositions, while permitting the formation of cellular structures in an efficient maner and at a reduced blowing agent cost.

Our activating compositions comprise polyvalent heavy metal compounds and includes those metal salts which are known to have an activating effect on azodicarbonamide, such as cadmium, zinc, lead and the like, and combinations thereof. The other necessary ingredients of our activating composition are alkali metal salts, particularly sodium and potassium and combinations thereof. The heavy metal and the alkali metal salts may be employed as organic or inorganic compounds. For example, these salts may include oxides, carbonates, phosphates, bicarbonates and the like with suitable specific compounds including zinc oxide, lead carbonate, barium carbonate, lead bicarbonate, potassium chloride, lead dibasic phosphites and the like. Heavy metal and alkali metal salts may also include oil soluble organic radicals to promote the solubility of these salts in various plasticizers, solvents, oils or polymeric compositions. These organic radicals may comprise aliphatic, alicyclic, heterocyclic, alkylene, alkyl and other organic groups. For example, typical organic radicals include $C_2$–$C_{20}$ short and long chain fatty acids like phthalates, oleates, acetates, propionates, 2-ethylhexylates, myristates, octylates, stearates, resin soaps and the like, and mixtures thereof. These heavy metal and alkali metal compounds are often formed by the reaction of the metal or a metal salt with a mono, di, or polycarboxylic acid or its derivatives to form a corresponding metal salt or metal soap. Alkali soaps of long chain fatty acids of more than six carbon atoms together with heavy metal containing soaps of from 2 to 12 carbon atoms have been found to be an excellent liquid combination for use with azodicarbonamide and bicarbonate in vinyl plastic compositions.

One very effective composition of our invention for use in preparing vinyl chloride foams of excellent quality comprises a mixture of azodicarbonamide, sodium bicarbonate and the salts of zinc and potassium, either as a liquid dispersion in a suitable plasticizer or as a dry powdered mixture. The use of a finely divided azodicarbonamide having an average particle size of the range of from about 1 to 3 microns, together with the use of a finely divided sodium bicarbonate of less than about 50 microns, e.g., 10 to 30 microns, provides a faster and sharper decomposition range than the correspondingly coarser grade materials. Our blowing agent compositions are characterized by sharp decomposition temperatures at good decomposition rates and by the preparation of a fine cellular high-quality foam product.

Sodium bicarbonate may be substituted for a portion of the azodicarbonamide in our chemical blowing agent compositions when the weight ratio of the alkali metal to the heavy metal is from about 1 to 5, to 5 to 1, with optimum results often observed in a ratio of about 1:2. Our activating compositions of heavy metal and alkali metal compounds are commonly employed in a ratio of the activating composition to the azodicarbonamide, or from about 1:10 to about 4:1, with good results usually obtained at a ratio of about 1:2. The sodium bicarbonate may be substituted for the azodicarbonamide in amounts ranging from about 1 to 40 weight percent or more, with good densities often achieved at a substitution of about 10 to 30 weight percent. Substitution of the sodium bicarbonate in an amount greater than about 40% may be employed, but larger amounts of sodium bicarbonate tend to produce cellular structures of correspondingly larger cell size.

Our chemical blowing agent compositions may be incorporated in a polymer or plastic composition in a sufficient amount to effect the desired chemical blowing action. Depending on the foam density desired, this amount may be varied from about 0.5 to 50 parts of the composition to 100 parts of the polymer plastic or resin component. In atmospheric or in open-mold blowing operations, such as in blowing or forming cellular sheets or layers on a carrier sheet, from 1 to 15 parts per 100 parts of the resin are commonly employed. In a closed mold or pressure-molding operation, higher amounts of from 10 to 50 parts per 100 parts of the resin may be used.

The heavy metal salts, the alkali metal salts, the sodium bicarbonate and the azodicarbonamide may be premixed together or added separately or in any combination to the plastic material to be blown. For example, these ingredients may be blended into a liquid non-volatile plasticizer such as a liquid phthalate and subsequently incorporated into a vinyl chloride plastisol composition, or when desired, these ingredients may be blended as a dry mix and subsequently incorporated and dispersed in the composition to be blown. The heavy metal and alkali metal salts concentration necessary to obtain activation and permit substitution of the sodium bicarbonate may be obtained from other ingredients added to the composition or to the polymer or plastic for other purposes. For example, all or a part of the alkali and metal salts may be obtained from heavy metal phosphites or alkali or heavy metal soaps added to the polymer as stabilizers or antioxidants additives.

Our discovery is primarily directed toward the employment of sodium bicarbonate, due to the relatively low cost of such a compound and its ready availability. However, where these factors are not a consideration, any metal bicarbonate may be employed which has a primary decomposition temperature range of from about 130–170° C. For example, potassium, or other bicarbonate may be so employed to substitute a portion of the azodicarbonamide in the presence of our activators.

Our chemical blowing compositions may be incorporated into and employed with a wide variety of plastic, polymeric and resin compositions to produce open or closed cellular structure in block, sheet or other form. Our compositions will find particular utility with those thermosetting and thermoplastic polymers, which require lower decomposition temperatures than those normally obtained with azodicarbonamide. Suitable gas retentive and gas expandable organic polymeric plastic materials and compositions would include, in particular, those thermoplastic vinyl polymers and resins such as those vinyl chloride resins, like polyvinyl chloride, copolymers of vinyl chloride and vinyl acetate and other short chain fatty acid esters, as well as other vinyl halides like vinylene and vinylidene chloride and the like, as well as thermosetting and curable natural and synthetic elastomers and resinous products. Our compositions are particularly directed toward the production of vinyl foam or vinyl cellular structures and may be incorporated in vinyl plastisol, organisols or in dry plasticized vinyl resin mixtures which are subsequently sheeted, extruded or calendered or otherwise formed and thereafter heated above the decomposition temperature to produce a cellular material. Blowable organic plastic materials are often characterized by being capable of setting to a normally solid state, by cooling or by curing, which materials have sufficient consistency and tensile strength at temperatures of from about 80 to 200° C., for example, 130–190° C. or higher to retain the expanded structure resulting from the evolvement of the gas, either in the mold or when removed therefrom. Plastic material, formed by the evolvement of the gas, can be retained in cellular structure by cooling in the case of thermoplastics such as vinyl resins, and by heating and curing with curing agents like zinc oxide and sulfur or peroxides or affecting cross-linking in the case of thermosetting materials, such as thermosetting resins and elastomers. The cellular materials so prepared may be formed on sheets such as paper, canvas, cloth, plastic film, wire screens and the like, and will normally find utility as thermal insulation, acoustical material, or as cushioning material or for buoyancy functions. The polymers to be expanded may also contain other additive ingredients to enhance various properties and to promote the final product acceptance. These additional materials may include heat and light stabilizers, plasticizers, antioxidants, dispersing agents, pigments, dyes, filler materials, resins, curing agents and the like.

Our invention is further illustrated by the following more detailed examples:

TABLE A

| Ingredients | Formulation | | |
| --- | --- | --- | --- |
| | 1-A, grams | 1-B, grams | 1-C, grams |
| Azodicarbonamide [1] | 0.33 | 0.26 | 0.26 |
| Sodium bicarbonate [2] | | 0.11 | 0.11 |
| Dioctyl phthalate (plasticizer) | 4.00 | 4.00 | 4.00 |
| Mixture A: | | | |
| Zinc 2-ethyl hexoate 0.184 grams | | | |
| Potassium oleate 0.072 grams | 0.33 | 0.33 | |
| Dioctyl phthalate 0.074 grams | | | |

[1] Average particle size 13–19 microns.
[2] Average particle size about 21 microns.

The decomposition temperature range of these samples in comparison to a reference sample was determined by a differential thermal analysis (DTA) thermovolumetric technique. This technique provides a decomposition exotherm of the blowing agent system in comparison to the temperature of the reference system. Each formulation prepared as shown in Table A was separately placed in one test tube, while in a second test tube was placed an equal amount of a reference sample of 0.11 gram silica and with four grams of dioctylphthalate. Thermocouples were inserted in each test tube, and both test tubes were immersed in a heating bath and heated at a rate of about 12° C. per minute. The difference in temperature between the formulations of Table A and the reference sample were plotted in millivolts on the ordinate (corresponding to the difference in temperature between the formulation and the reference) against the temperature of the reference sample on the abscissa. This testing provides a sensitive measure of the decomposition temperature of each formulation. The drawing shows representative samples of plots obtained from the samples 1A, 1B and 1C, showing the decomposition exotherm at each blowing agent formulation versus the reference temperature.

Curve No. 1A shows the sharp decomposition of the azodicarbonamide in the presence of the zinc and potassium salt activators.

Curve No. 1B was obtained with a similar system in which 20% of the azodicarbonamide was replaced with sodium bicarbonate on a gas yield basis. Because of the relative difference in gas yields about 1.5 grams of sodium bicarbonate are required to provide the same gas yield volume as about 1.0 gram of azodicarbonamide. Curves 1A and 1B are essentially the same with the decomposition beginning at about the same temperature range with the decomposition rate of curve 1B somewhat faster than the decomposition rate of curve 1A. On a gas release basis the azodicarbonamide-solution bicarbonate formulation 1B releases gas at a somewhat faster rate than the pure azodicarbonamide system. These decomposition curves illustrate that the lower cost azodicarbonamide-sodium bicarbonate systems will provide foams of equal quality to those produced with the higher cost pure azodicarbonamide system.

Curve 1C shows two separate decomposition temperature ranges corresponding to the individual sodium bicarbonate and azodicarbonamide components. The gas evolution occurs slowly over a wide temperature range with peaks for each individual component. This type of decomposition is ineffective as a practical blowing agent system for polyvinyl chloride and other resins. As illustrated the release of the carbon dioxide gas from the sodium bicarbonate has a retarding effect on the release of the nitrogen from the azodicarbonamide. These curves demonstrate that the presence of our activator components is essential, and permits the substitution of a portion of the azodicarbonamide with the sodium bicarbonate,, with a resultant single decomposition temperature range for the mixture of blowing agents.

*Example 2*

Polyvinylchloride (PVC) foamable plastisol compositions were prepared as follows to evaluate various blowing agent systems:

TABLE II

| | Formulations (parts by weight) | |
| --- | --- | --- |
| | 2-A | 2-B |
| Exon 605 (Low molecular weight PVC resin) | 100.0 | 100.0 |
| Dioctyl Phthalate | 90.0 | 90.0 |
| Epoxidized Soybean Oil | 5.0 | 5.0 |
| Titanium Dioxide | 5.0 | 5.0 |
| Kempore (Azodicarbonamide 1.3–1.9 microns) | 2.0 | 1.6 |
| Mixture A (As in Example 1) | 2.0 | 2.0 |
| Sodium Bicarbonate (21.0 microns) | | 0.7 |

The above plastisol compositions were prepared and passed through a 3-roll laboratory paint mill. Composition 2-A contained a blowing agent system comparable to that used in obtaining curve 1A. Composition 2-B contained an azodicarbonamide-sodium bicarbonate blowing agent system that was equivalent to that used in obtaining curve 1B.

The two plastisol compositions were cast as 20 mil films on a support sheet, and expanded in a Dawson oven under varying temperature conditions for 90 seconds.

The foam density reached at the different temperatures was as follows:

| Temp., °C. | Density, lbs./cu. ft. | |
| --- | --- | --- |
| | Composition 2-A | Composition 2-B |
| 160 | 55.5 | 53.5 |
| 170 | 44.0 | 43.5 |
| 180 | 36.5 | 35.0 |
| 190 | 25.5 | 26.0 |

The same density in the finished foams was reached with both the expensive and inexpensive blowing agent systems. In addition, the foam samples were the same with regard to color and uniform cell structure.

*Example 3*

When our activator system comprises an oil soluble zinc and potassium fatty acid salt system or liquid oil soluble salts these ingredients are often dispersed in a viscous liquid such as plasticizer to produce a concentrated liquid activator system. In normal use this system must be further diluted by the ultimate user with a suitable solvent, such as additional plasticizers like dioctylphthalate or even mineral spirits or solvents in order to obtain a product that can be readily poured at room temperature. In order to utilize this system the user must buy the azodicarbonamide and the liquid activator separately or purchase the two materials combined in a suitable solvent dispersion and further dilute the system. We have now found that an efficient economic extended dry azodicarbonamide blowing agent system or mixture may be prepared by preparing a dry powdered one-package blend. This blend may comprise azodicarbonamide or azodicarbonamide substituted in part with sodium bicarbonate in our activated system without the need for any additional solvent or plasticizer carrier liquids for dilution or fluidity purposes. Further, the dry system obviates the need to pay freight costs on inexpensive carrier liquid and reduces storage requirements for the user.

Additionally in some foam applications, such as in preparing polyvinyl chloride foams where hard foam structures are required, the presence of an oil soluble heavy metal salt often adds an undesirable plasticizing effect to the finished product. Typically, in the preparation of polyvinyl chloride foam, zinc in the form of the zinc salt of 2-ethyl hexoic acid has a plasticising effect which is sometimes undesirable. Accordingly, we have found that zinc in the form of a zinc inorganic salt such as zinc oxide may be employed in our dry blends, which does not exhibit a plasticizing effect on the polyvinyl chloride foams. Dry powder activated azodicarbonamide blowing agent systems are prepared by blending the desired ingredients together such as in a ribbon blender as shown in the accompanying Table III.

TABLE III

| Ingredients | Formulations (parts by weight) | | |
|---|---|---|---|
| | 3-A | 3-B | 3-C |
| Azodicarbonamide | 70 | 70 | 70 |
| Zinc oxide | 12 | 12 | 12 |
| Potassium Oleate | 10 | 10 | |
| Sodium bicarbonate | | 45 | |
| Sodium stearate | | | 10 |

Blends 3-A and 3-C comprise about 76% active azodicarbonamide with about 1.32 parts of these blends equal to about 1 part pure azodicarbonamide. Blend 3-B gives approximately the same gas yield as 73% active azodicarbonamide with 1.37 parts of the 3-B blend equal to about one part of azodicarbonamide in gas yield. Tests employing the differential thermal analysis technique to establish the decomposition temperature range of dry blend blowing agent systems showed that the dry powder activated azodicarbonamide blends all decompose at essentially the same temperature range as the activated semi-liquid dispersions or liquid dispersions systems previously employed. Accordingly the processing advantages described for the dry activated powder systems 3-A, 3-B and 3-C are obtainable with the same level of decomposition activation as attained with liquid activated systems.

Additionally, formulation 3-B permitted the substitution of a portion of the azodicarbonamide in dry powdered form with powdered sodium bicarbonate which formulation gave the same gas yield as a pure activated azodicarbonamide at a substantially lower cost. The decomposition of the 3-B blend occurred in substantially the same temperature range as the pure azodicarbonamide system of 3-A.

*Example 4*

Polyvinylchloride foamable palstisol compositions were prepared as follows to evaluate the blowing agent systems of dry blends of sodium bicarbonate and azodicarbonamide in comparison with the employment of azodicarbonamide alone.

TABLE IV

| | Formulations (parts by weight) | |
|---|---|---|
| | 4-A | 4-B |
| Exon 605 (low molecular weight PVC resin) | 100.0 | 100.0 |
| Dioctyl phthalate | 85.0 | 85.0 |
| Epoxidized Soybean Oil | 5.0 | 5.0 |
| A commercial oil soluble barium, cadmium and zinc soap stabilizer | 2.0 | 2.0 |
| Formulation 3-B | 2.74 | |
| Azodicarbonamide | | 2.0 |

The above plastisol compositions were prepared and passed through a 3-roll laboratory paint mill. The two plastisol compositions were cast as 20 mil films and expanded at 200° C. in the Dawson oven at varying oven residence times.

The foam densities attained at the different residence times were as follows:

| Residence time (seconds) | Apparent Density, lbs./cu. ft. | |
|---|---|---|
| | 4-A | 4-B |
| 30 | 46 | 56 |
| 45 | 32 | 35 |
| 60 | 21 | 24 |
| 75 | 19.5 | 19.5 |
| 90 | 16 | 16 |

The data show that essentially the same densities were reached with the pure azodicarbonamide and the bicarbonate extended formulations. The foam samples were also the same with regard to color and uniform cell structure.

*Example 5*

In foamed nitrile rubber-polyvinyl chloride systems which are used for fabricating flexible heat-resistance snap-on cold and hot water pipe insulation or for other thermal insulation and acoustical purposes a blowing agent is required with a sharp decomposition temperature and a rapid gas release rate. A blowing agent such as p,p-oxybisbenzenesulfonylhydrazide is often employed with mixtures of nitrile rubber such as polyacrylonitrile and rubbery copolymers of acrylonitrile and butadiene with vinyl resins. This polymer mixture is commonly extended with a carbon black or other fillers with the nitrile rubber cured with a zinc and sulfur curing system and with the polyvinyl chloride being plasticized. Azodicarbonamide with the proper sharp decomposition would be more efficient in an application of this nature due to its higher gas release per gram (220 ccs. per gram azodicarbonamide vs. 130 ccs. per gram of the paraparaoxybisbenzenesulfonylhydrazide) at substantially lower cost. All the activated dry powdered systems 3-A, 3-B and 3-C exhibit sufficiently sharp decomposition characteristics while formulation 3-B is particularly adapted to this purpose due to its lower cost.

Sodium bicarbonate is an odorless non-toxic white powder which is commercially available as an intermediate in the manufacture of soda ash by the Solvay process. It normally decomposes slowly at about 100° C. with the evolution of carbon dioxide, while at above about 140° C. decomposition proceeds at a fairly rapid rate. The degree of dissociation of sodium bicarbonate tends to decrease with increased pressure, and therefore is not usually used alone in high pressure expansion or pressure molding processes. However, incorporated in our activated azodicarbonamide systems it may be successfully employed for closed mold systems, but such processes will normally require use of smaller quantities of the sodium bicarbonate in replacing the azodicarbonamide.

Where sodium bicarbonate is employed in a fine dry powder blend the finely ground sodium bicarbonate may be blended with moisture retaining and desiccant type additives to reduce moisture pickup, such as silica, stearic acid, magnesium stearate, calcium oxide, magnesium carbonate and the like. Where the sodium bicarbonate is substituted for a portion of the azodicarbonamide in liquid systems a surface active, dispersing or wetting agent may be employed to disperse the finely ground sodium bicarbonate in the liquid plasticizer.

The normal decomposition of sodium bicarbonate and other bicarbonates leads to the evolution of about one-half the amount of carbon dioxide available in the total molecule. A total decomposition of the bicarbonate can be achieved by the use of acidic additive materials, such as weak acids or acid salts to obtain a higher gas yield. Thus sodium bicarbonate may be further activated by the use of other additives which are compatible with the polymer systems. For example, suitable additives may comprise fatty acids like stearic acid, oleic acid or cotton seed oil acid. In employing our blowing agent systems with thermosetting resins, the acidic curing catalyst employed may also act as a further activator for the blowing agent. Phenolformaldehyde and urea-formaldehyde foams may be prepared with our blowing agent system by reacting the bicarbonate with an acid type hardener.

Our discovery provides for the employment of both liquid and dry blowing agent systems comprising azodicarbonamide in which a portion of the more expensive azodicarbonamide may be replaced by the relatively inexpensive inorganic salt sodium bicarbonate. Our discovery provides a blowing agent system of the same or better quality than the use of pure azodicarbonamide.

Further, our invention permits the use of azodicarbonamide-sodium bicarbonate systems in a dry one-package mixture, and also provides for a common decomposition temperature range for both blowing agents. Our blowing agent systems provide unique features and advantages not hitherto possible in the production of cellular and foam structures.

What is claimed is:

1. A blowing agent composition having a single primary decomposition temperature range which composition comprises in combination:
   azodicarbonamide;
   a polyvalent heavy metal salt which lowers the decomposition temperature of the azodicarbonamide;
   an alkali metal salt; and
   a bicarbonate selected from the group consisting of sodium and potassium bicarbonates, the bicarbonate present in an amount from about 1 to 40% by weight based on the azodicarbonamide the ratio of the heavy metal to the alkali metal ranging from about 5:1 to 1:5 and the ratio of the alkali metal to azodicarbonamide ranging from about 1:10 to about 4:1.

2. The composition of claim 1 wherein the heavy metal is selected from the group consisting of zinc, lead, cadmium and combinations thereof; and the alkali metal is potassium.

3. The composition of claim 1 wherein the alkali metal is potassium.

4. The composition of claim 1 wherein the azodicarbonamide has an average particle size range of from about one to three microns and the bicarbonate has an average particle size range of less than about fifty microns.

5. The composition of claim 1 wherein the composition is dispersed in an organic liquid and the heavy metal and alkali metal salts are oil-soluble organic salts.

6. The composition of claim 1 wherein the composition is a dry blend which includes zinc oxide.

7. The composition of claim 1 wherein the bicarbonate is present in an amount of from about ten to 30% by weight, the heavy metal is zinc and the alkali metal is potassium.

8. A blowable polymer composition which comprises a gas-expandable thermoplastic polymer capable of being expanded in the plastic state by the evolution of a gas to form a cellular structure, the polymer containing a blowing amount of the blowing agent composition of claim 1.

9. A blowable polymer composition which comprises a gas expandable composition of a nitrile rubber and a vinyl resin which contains a blowing amount of the blowing agent composition of claim 2.

10. The polymer composition of claim 9 wherein the mixture includes a nitrile rubber selected from the group consisting of polyacrylonitrile, copolymers of acrylonitrile and butadiene and combinations thereof, a curing agent for the nitrile rubber, and the vinyl resin is a plasticized vinyl chloride resin.

11. A method of preparing a vinyl chloride resin cellular material which method comprises:
    incorporating into a gas expandable polymer composition which includes a vinyl chloride resin, a blowing amount of a blowing agent composition as defined in claim 2; and
    heating the polymer composition to a temperature between about 150 to 170° C. to decompose both the azodicarbonamide and the bicarbonate in the blowing agent composition to form a cellular polymer material.

References Cited

UNITED STATES PATENTS 3,067,151 12/1962 Terry et al. _____ 260—2.5
3,197,423 7/1965 Ackerman _____ 260—2.5

MURRAY TILLMAN, *Primary Examiner.*

SAMUEL H. BLECH, *Examiner.*

W. J. BRIGGS, *Assistant Examiner.*